B. R. ALDEN.
Lamp Burner.
No. 36,694.
Patented Oct. 21, 1862.
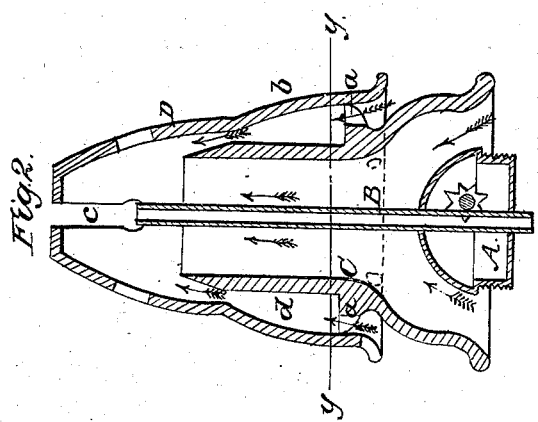
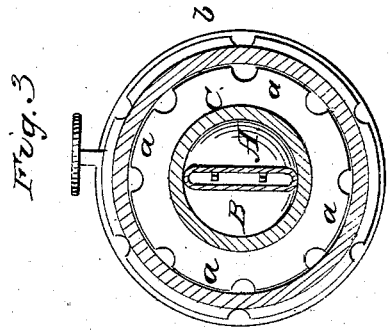
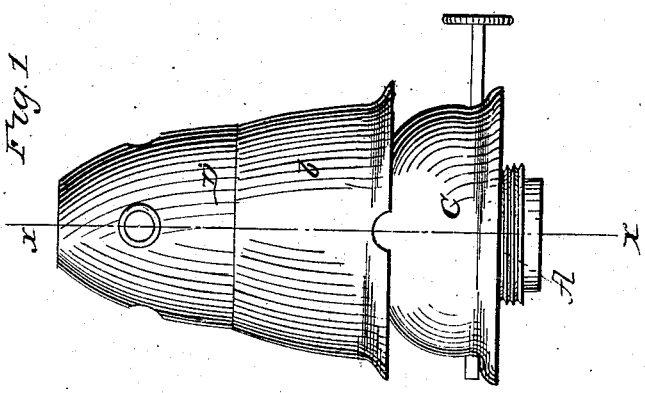
Witnesses
Inventor
B. R. Alden

UNITED STATES PATENT OFFICE.

BRADFORD R. ALDEN, OF NEW YORK, N. Y.

IMPROVEMENT IN LAMP-BURNERS.

Specification forming part of Letters Patent No. 36,694, dated October 21, 1862.

*To all whom it may concern:*

Be it known that I, BRADFORD R. ALDEN, of the city, county, and State of New York, have invented a new and useful Improvement in Lamp-Burners for Burning Coal-Oil and other Similar Hydrocarbons; and I do hereby declare that the following is a full, clear, and exact description of the same, reference being had to the accompanying drawings, making a part of this specification, in which —

Figure 1 is an external view of my invention; Fig. 2, a vertical central section of the same, taken in the line $x$ $x$, Fig. 1; Fig. 3, a horizontal section of the same, taken in the line $y$ $y$, Fig. 2.

Similar letters of reference indicate corresponding parts in the several figures.

This invention consists in the employment or use of a cone or deflector constructed of porcelain, pottery, earthenware, or any baked earth or earthy cement which is a good non-conductor of heat, said cone being applied to a case or jacket which surrounds the wick-tube, substantially as hereinafter fully shown and described, whereby many advantages are obtained over the ordinary metal cones or deflectors hitherto used in coal-oil lamps, as hereinafter set forth.

To enable those skilled in the art to fully understand and construct my invention, I will proceed to describe it.

A represents a metal cap, which is screwed into the top of the lamp, and B is a metal wick-tube, which may be of the ordinary flat kind used in coal-oil lamps.

C is a case or jacket which surrounds the metal wick-tube B, and which is constructed of porcelain, earthenware, or other suitable material which is a good non-conductor of heat. This case or jacket has a series of projections, $a$, on its outer surface, which extend all around it and form a bearing-surface for the lower part of the cone or deflector D to rest upon, as shown clearly in Fig. 2. The cone or deflector D may be extended down considerably below the upper end of the case or jacket C, and the lower part of the cone or deflector D may be considered as a skirt, and this skirt (designated by $b$) rests on the projections $a$ of the case or jacket.

The case or deflector is constructed of porcelain, pottery, earthenware, or any baked earth or earthy cement. It is provided at its apex with the usual slot or openings, $c$, and its skirt $b$ projects out sufficiently far from the case or jacket C to admit of a draft-passage, $d$, between them, as shown clearly in Fig. 2.

The advantages of a cone constructed of any of the materials specified are, that it prevents the heat from the flame being conducted down to the lamp and volatilizing too rapidly the oil within it, as it is a poor conductor of heat, and it also prevents the air in its passage upward to the flame being much rarefied, as is the case with the metal cones and skirts hitherto used. This rarefaction of the air in the case of metal greatly reduces the supply of oxygen to the flame, and though the current or strength of the draft may not be appreciably decreased, yet, as the air is greatly rarefied, it of course must contain a less amount of oxygen in a given volume than cooler air. The metal cones also oxidize to a certain extent and color the flame.

By using the cone constructed of any of the materials specified, with the case or jacket C constructed of a material which is a good non-conductor of heat, a very superior burner is obtained. The cone D, however, when used with a metal burner, is far superior to the metal cones hitherto used, and when constructed of porcelain, pipe-clay, earthenware having a white enameled surface it serves as an admirable reflector of light, not absorbing any of its rays, at least not in an appreciable degree, and it also admits of being very readily cleaned. By means of this cone and a case or jacket of suitable height, the ordinary glass draft-chimney may be dispensed with, although it may be used, if desired.

I do not claim, separately, the case or jacket C, for that is not my invention; but,

Having thus described my invention, what I do claim as new, and desire to secure by Letters Patent, is—

1. A lamp-burner provided with a cone or deflector constructed of porcelain, pottery, earthenware, or any baked earth or earthy cement, substantially as set forth.

2. The combination of said cone with the case or jacket C, arranged substantially as and for the purpose specified.

BRADFORD R. ALDEN.

Witnesses:
EDW. W. HODGSON,
JAMES LAIRD.